United States Patent
Yang et al.

(10) Patent No.: US 12,423,903 B2
(45) Date of Patent: Sep. 23, 2025

(54) CLOUD IMAGE RENDERING FOR CONCURRENT PROCESSES

(71) Applicant: Tencent Technology (Shenzhen) Company Limited, Guangdong (CN)

(72) Inventors: Guangdong Yang, Shenzhen (CN); Xi Tang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 156 days.

(21) Appl. No.: 18/385,583

(22) Filed: Oct. 31, 2023

(65) Prior Publication Data

US 2024/0062450 A1 Feb. 22, 2024

Related U.S. Application Data

(63) Continuation of application No. PCT/CN2022/141262, filed on Dec. 23, 2022.

(30) Foreign Application Priority Data

Jan. 19, 2022 (CN) .......................... 2022100602852

(51) Int. Cl.
*G06T 15/00* (2011.01)
(52) U.S. Cl.
CPC .................. *G06T 15/005* (2013.01)
(58) Field of Classification Search
CPC ........ G06T 15/005; G09G 5/14; G09G 5/363; G09G 2350/00; G06F 3/1423; G06F 9/45558; G06F 9/505; G06F 2009/45587
See application file for complete search history.

(56) References Cited

U.S. PATENT DOCUMENTS

2013/0346561 A1* 12/2013 Eom ....................... H04L 65/60
709/219
2014/0152893 A1* 6/2014 Martinik .............. H04N 1/6011
345/531
(Continued)

FOREIGN PATENT DOCUMENTS

CN 111611017 A 9/2020
CN 111870948 A 11/2020
(Continued)

OTHER PUBLICATIONS

Jan. 19, 2022—(PCT) International Search Report and Written Opinion—PCT/CN2022/141262.
(Continued)

*Primary Examiner* — Temesghen Ghebretinsae
(74) *Attorney, Agent, or Firm* — Banner & Witcoff, Ltd.

(57) ABSTRACT

Aspects described herein relate to a picture display methods, systems, and products. An illustrative method is performed by the electronic device and can be applied to fields such as cloud technology or intelligent transportation. The method may include: receiving, from a target instance of a plurality of instances executed on a server, a request for information associated with a primary display of a plurality of displays; generating, based on the target instance corresponding to a non-primary display of the at least one non-primary display, virtual display information that simulates the corresponding non-primary display as a primary display for the target instance; sending the virtual display information to the target instance, wherein the virtual display information is configured to enable the target instance to identify the non-primary display as the primary display for the target instance; and generating a rendered picture for the corresponding non-primary display.

20 Claims, 6 Drawing Sheets

(56) References Cited

U.S. PATENT DOCUMENTS

| | | | | |
|---|---|---|---|---|
| 2016/0147494 A1* | 5/2016 | Wright | ............... | H04L 69/329 |
| | | | | 715/761 |
| 2020/0346109 A1 | 11/2020 | Kavallierou | | |
| 2021/0360086 A1* | 11/2021 | Huang | ............... | H04N 21/4781 |
| | | | | 345/629 |

FOREIGN PATENT DOCUMENTS

| | | |
|---|---|---|
| CN | 112099946 A | 12/2020 |
| CN | 114398018 A | 4/2022 |

OTHER PUBLICATIONS

Notice of Refusal, Japanese Patent Application No. JP2024-519701, issued on Feb. 28, 2025 by the Japan Patent Office (JPO). Translation attached.

* cited by examiner

CLOUD IMAGE RENDERING FOR CONCURRENT PROCESSES

CROSS-REFERENCE TO RELATED APPLICATIONS

This application is a continuation application of PCT/CN2022/141262, which designates the US and was filed Dec. 23, 2022, which in turn claims priority to Chinese Patent Application No. 202210060285.2, filed Jan. 19, 2022, each of which is incorporated herein by reference in its entirety.

FIELD OF THE TECHNOLOGY

Aspects described herein relate to the field of computer technology, and in particular, to a picture display method and apparatus, an electronic device, a computer storage medium, and a computer program product.

BACKGROUND OF THE DISCLOSURE

With the popularization of computer technology, the picture display technology supporting multi-process concurrent picture display rapidly grows. However, the multi-picture display in the related art is obviously dependent on the primary display. In particular, this display technology renders the pictures in a concurrent way, but all the final pictures are displayed on the primary display. As such, the load on the primary display may be too high, thereby reducing the number of concurrent processes. In addition, graphics rendering may be abnormal and even fail to display a picture.

SUMMARY

In order to solve at least one of the above technical problems, aspects described herein provide a picture display method and apparatus, an electronic device, a computer storage medium, and a computer program product, reducing an abnormality rate in the process of sensing a display by a target instance.

Some aspects described herein provide a picture display method, performed by an electronic device, the method including: generating virtual primary display information for simulating the primary display based on a display information acquisition request being received, the display information acquisition request being transmitted by a target instance, the target instance being any one of a plurality of instances, and a target display corresponding to the target instance being the primary display or an auxiliary display; and feeding back the virtual information of the primary display to the target instance, enabling the target instance to determine the target display corresponding to the target instance as the primary display, and displaying a rendered picture on the target display.

Some aspects described herein provide a picture display apparatus, including: a simulation module, configured to generate virtual information of a primary display for simulating the primary display based on a display information acquisition request being received, the display information acquisition request being transmitted by a target instance, the target instance being any one of a plurality of instances, and a target display corresponding to the target instance being the primary display or an auxiliary display; and a feedback module, configured to feed back the virtual information of the primary display to the target instance, enable the target instance to determine the target display corresponding to the target instance as the primary display, and display a rendered picture on the target display.

Some aspects described herein provide a computer-readable storage medium, storing at least one instruction or at least one program, the at least one instruction or at least one program being loaded and executed by a processor to perform the picture display method described above.

Some aspects described herein provide an electronic device, including at least one processor and a memory in communication connection with the at least one processor, the memory storing an instruction executable by the at least one processor, and the at least one processor executing the instruction stored in the memory to perform the picture display method described above.

Some aspects described herein provide a computer program product, including a computer program or instruction which, when executed by a processor, performs the picture display method described above.

According to an aspect described herein, by simulating the virtual information of the primary display and transmitting the virtual information of the primary display to the target instance, the target instance determines the target display corresponding to the target instance as the primary display, and the rendered image is displayed on the target display, thus achieving isolation between different displays and isolation between different instances. The target instance can only see the target display corresponding thereto, but cannot sense the existence of other displays. Therefore, it avoids various abnormal and non-working problems which may occur when the target instance senses the existence of other displays and breaks through a bottleneck of concurrent performance.

BRIEF DESCRIPTION OF THE DRAWINGS

In order to illustrate the technical solutions and advantages of aspects described herein, the following drawings are referred to herein and are briefly described below. It will be apparent that the drawings represent only some embodiments described herein, and other drawings and embodiments can be readily obtained by those skilled in the art based on the present disclosure.

DESCRIPTION OF EMBODIMENTS

Referring to the accompanying drawings, various technical solutions are further described below. It is apparent that the aspects and embodiments described are only some, but not all, aspects and embodiments of this application. Other aspects and embodiments can be obtained by those skilled in the art based on the present disclosure.

In the specification, claims, and the foregoing drawings of this application, the terms "first", "second", and the like are intended to distinguish between similar objects and are not necessarily used for describing a specific order or chronological order. It is to be understood that the data used in this way are interchangeable under appropriate circumstances such that the aspects described herein can be implemented in a sequence other than those illustrated or described herein. Moreover, the terms "include" and "have", and any variation thereof are intended to cover a non-exclusive inclusion, for example, a process, method, system, product, or server that includes a list of steps or elements is not necessarily limited to those steps or elements expressly listed, but may include other steps or elements not expressly listed or inherent to such a process, method, product, or device.

To make objectives, technical solutions, and advantages disclosed herein clearer, various aspects are described below with reference to the accompanying drawings. It is understood that the particular embodiments and aspects described herein are illustrative only and do not limit the scope of protection defined by the claims.

In the following, the terms "first" and "second" are merely used for describing the objectives and are not understood as indicating or implying the relative importance, or implicitly indicating the number of indicated technical features. Thus, features defined with the "first" or "second" may explicitly or implicitly include one or more of the features. In the description herein, unless otherwise specified, the meaning of "multiple" is two or more. In order to facilitate a better understanding of aspects described herein, some relevant technical terms are provided below.

1) Intelligent traffic system (ITS) is also referred to as an intelligent transportation system. It effectively and comprehensively applies advanced science and technology (information technology, computer technology, data communication technology, sensor technology, electronic control technology, automatic control theory, operational research, artificial intelligence, and the like) to traffic and transportation, service control, and vehicle manufacturing to strengthen the relationship between a vehicle, a road, and a user, thereby forming an integrated transportation system to ensure safety, increase efficiency, improve the environment, and conserve energy.

2) Intelligent vehicle infrastructure cooperative system (IVICS), abbreviated as vehicle infrastructure cooperative system, is a growth direction of the intelligent traffic system. The vehicle infrastructure cooperative system is a safe, efficient, and environment-friendly road traffic system, which adopts advanced technologies, such as wireless communication and the new generation Internet to implement dynamic real-time information exchange of vehicle-vehicle and vehicle-road, and perform vehicle active safety control and road cooperation management based on whole time-space dynamic traffic information acquisition and fusion, so as to fully realize the effective cooperation between people, the vehicle and the road, ensure traffic safety, and improve traffic efficiency.

3) Cloud game is a game mode based on cloud computing. In the running mode of a cloud game, all games are run at a server, and the rendered game pictures are compressed and then transmitted to a client via a network. A game device of the client does not require any high-end processor and graphics card, and only requires basic video decompression capability to support game running.

4) Application programming interface (API): the application programming interfaces are some predefined functions designed to provide applications and the ability for developers to access a set of routines based on certain software or hardware without the need to access a source code or understand the details of an internal working mechanism.

5) Graphics card virtualization refers to a scheme of providing a graphics card for a plurality of virtual machines (VM) by a corresponding technology. This technology is divided into hardware and software implementations, in which hardware-implemented graphics card virtualization usually requires the technical support of the graphics card manufacturer.

6) Virtual machine (VM) refers to a complete computer system with complete hardware system functions simulated by software and running in a completely isolated environment. The VM may run on a virtualization platform. It may also be referred to as a guest machine.

7) Container is a container technology, which effectively partitions resources of a single operating system into isolated groups to better balance conflicting resource usage requirements among the isolated groups.

8) Graphics processing unit (GPU) is also referred to as a display core, a visual processor, and a display chip. It is a microprocessor specialized in performing image and graphics related operations on a personal computer, a workstation, a game console, and some mobile devices (such as a tablet computer and a smart phone). In the embodiments of this application, the GPU may be used as the graphics card.

9) Peripheral component interconnect express (PCIe) is a high-speed serial computer expansion bus standard. PCIe belongs to high-speed serial, point-to-point, dual-channel, and high-bandwidth transmission. Connected devices allocate exclusive channel bandwidth, do not share bus bandwidth, and mainly support functions, such as active power supply management, error reporting, end-to-end reliability transmission, hot plug, and service quality.

10) Frame Per Second (FPS): FPS is a definition in the field of images, and refers to frame per second and colloquially to the number of pictures of an animation or a video. FPS is to measure the amount of information for storing and displaying a dynamic video. The greater the number of frames per second is, the smoother the displayed motion becomes. In general, the smallest number of avoiding unsmooth movement is 30. Some computer video formats can only provide 15 frames per second.

11) RGBA color space is a color space representing red, green, blue, and alpha.

12) Instance: in object-oriented programming, a class after instantiation is referred to as an instance. The class is static and does not occupy process internal memory; the instance has dynamic internal memory. In a database, it represents a set of some programs and refers to a database program that can support the operation of the database.

Various schemes for picture display may be provided in the related art. Aspects described herein do not limit the application scene of the picture display. For example, the picture display may be performed in the scenes, such as a cloud game, a cloud community, a cloud e-commerce, and intelligent driving. Taking the cloud game as an example, the cloud game is a game mode based on cloud computing. In the running mode of a cloud game, all games are run at a server, and the rendered game pictures are compressed and then transmitted to a client via a network. An electronic device running the client does not require any high-end processor and graphics card, and only requires basic video decompression capability to support game execution.

In the cloud game scene, at the server, the operating system may run one game instance, and each game instance may correspond to one client. By running the game instance at the server, the displayed picture is compressed and transmitted to the client, so that the client may display the picture by decompressing. Aspects described herein do not limit the game instance.

Aspects described herein may also run using VM technology. At the server, the operating system may run one virtualization application, and each virtualization application may correspond to one client. By running the virtualization application at the server, the displayed picture of the virtualization application is compressed and transmitted to the client, so that the client may display the picture by decompressing.

Figure 1:
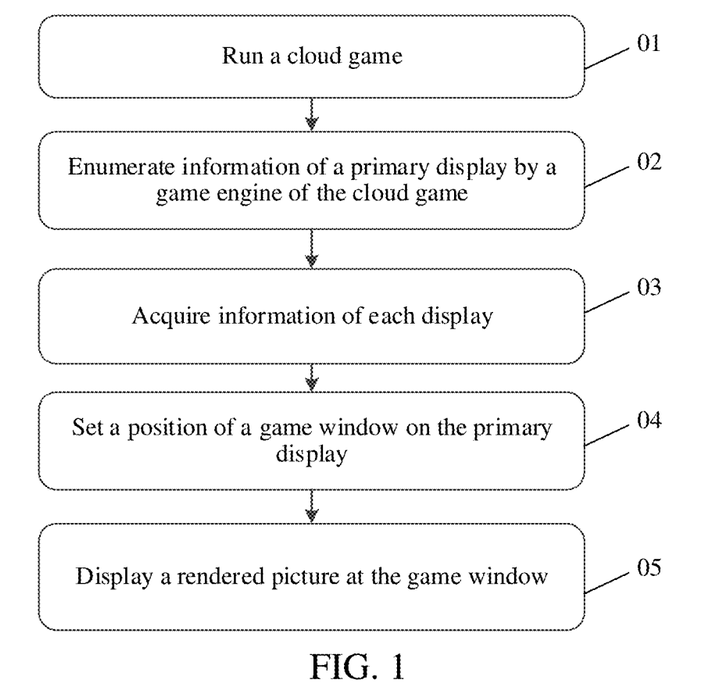
FIG. 1 is a flowchart of multi-picture display in the related art.

In some embodiments, in the cloud game scene, the operating system at the server may also be configured with multiple graphics cards to run a plurality of game instances. Executing a cloud game may include: under a multi-graphics card system, each graphics card may be connected to one display, namely, the graphics card may construct a one-to-one mapping with the display. The server usually provides a virtual display connected graphics card in a virtual or simulated way. FIG. 1 shows a flowchart of multi-picture display in the related art.

Step 01: Run a cloud game.

Step 02: Enumerate information of a primary display by a game engine of the cloud game. In particular, the information of the display may be macroscopic number information of the display.

Step 03: Acquire information of each display. In particular, when the macroscopic number information is obtained, each display in server environment is acquired. These displays may be real or virtual displays.

Step 04: Set a position of a game window on the primary display.

Step 05: Display a rendered picture at the game window.

After setting a position of a game window on the primary display in step 04, computing is started, a game picture is rendered, and the game picture is outputted to the above window. Each game instance may correspond to one display (either a primary display or an auxiliary display. The auxiliary display is a non-primary display), the relevant computing and the rendering of the game picture are performed by the graphics card corresponding to the display, and a rendering result is displayed in the game window of the primary display.

On the premise of describing the above picture display technology of the cloud game, it can be seen that in a concurrent scene of multi-graphics card and multi-game instances, there may be the following technical problems due to various interactive operations of a cloud game server in the game.

Figure 2:
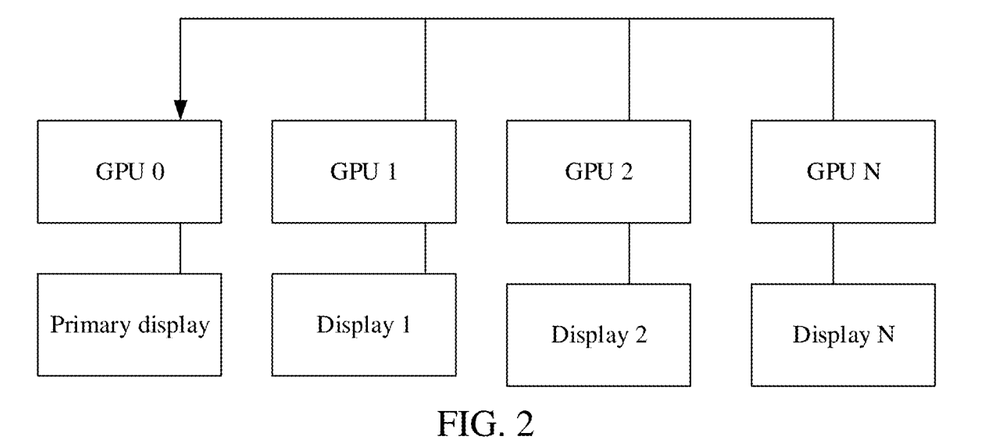
FIG. 2 is a load distribution diagram of concurrent picture display in the related art.

First, there are performance and cost problems. All the plurality of game instances set the window on a position of the primary display, and the final game pictures are outputted to the same display. As such, the PCIe of the GPU connected to the primary display creates a bottleneck state, the display performance problem appears, or the number of game theory concurrency is low, resulting in an increased game running cost. Referring to FIG. 2, a load distribution diagram of concurrent picture display in the related art is shown. GPU 0, GPU 1, GPU 2, and GPU N are graphics cards, in which GPU 0 is the graphics card corresponding to the primary display. Each graphics card may provide the services of the computing and picture rendering for the corresponding game instance, but the finally rendered picture might only be displayed in the window in the primary display corresponding to GPU 0, resulting in a high load at GPU 0. For example, if the resolution requirement for a game instance is 1920*1080, the frame rate requirement is 60 FPS, the RGBA graphics data size is 1920*1080*4*60/(1024*1024)=475 megabytes (MB), and the theoretical transmission speed of PCIe Gen 3×16 is 16 gigabytes per second (GB/s), then the theoretical number of concurrency that can be achieved based on the above configuration is about 30, and the number of concurrency is severely limited.

In addition, there may be compatibility problems. Some games may have compatibility problems, such as game starting failure and abnormal window position, and different game instances may have different behavioral performance.

In order to solve the above performance, cost, and compatibility problems, aspects described herein provide a picture display method. The method can achieve isolation between the graphics cards and that between the instances, realize concurrency on a picture rendering level, and implement separation on picture display, avoiding displaying many pictures in the same primary display. As such, the performance bottleneck is broken through, the number restriction of concurrency is lifted, and the compatibility problems can be avoided.

Aspects described herein may relate to cloud technology. Cloud technology refers to a kind of hosting technology which unifies a series of resources, including hardware, software, and a network in the wide area network or local area network to realize data computing, storage, processing, and sharing. The cloud technology is a general term of network technology, information technology, integration technology, management platform technology, application technology, and the like based on the cloud computing business mode application. It can form a resource pool and can be used as needed, which is flexible and convenient. Cloud computing is an important support technology. Background services of the technical network system require a large amount of computing and storage resources, such as video websites, picture-type websites, and more portal websites. With the high growth and application of the Internet industry, each item may have its own identification mark in the future and needs to be transmitted to the background system for logical processing. The data of different levels will be processed separately. All kinds of industry data need strong system backing support, which can only be realized by cloud computing.

Aspects described herein may be applied to various cloud applications provided based on cloud technology, such as a medical cloud. The medical cloud, based on the new technologies, such as cloud computing, mobile technology, multimedia, 4G communication, big data, and Internet of things, may use "cloud computing" to create a medical health service cloud platform combined with the medical technology, achieving the sharing of medical resources and the expansion of medical coverage. Because of the application and combination of the cloud computing technology, the medical cloud can improve the service efficiency of medical institutions and facilitate residents to seek medical advice. For example, appointment registration in a hospital, medical insurance accounting, and the like are all the products of cloud computing combined with the medical field. The medical cloud also has the advantages of data security, information sharing, dynamic expansion, and global layout.

Figure 3:
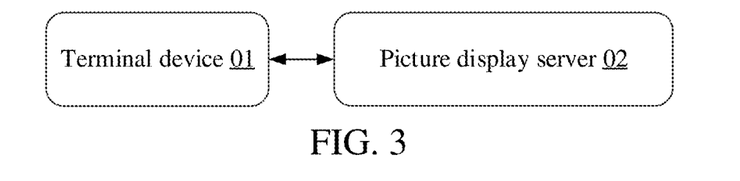
FIG. 3 is a schematic diagram of a feasible implementation framework of a picture display method according to one or more illustrative aspects described herein.

Referring to FIG. 3, a schematic diagram of an illustrative implementation framework of a picture display method is shown. As shown in FIG. 3, the implementation framework may include at least a terminal device 01 and a picture display server 02. The terminal device 01 may be an electronic device located in the Internet and may provide various Internet-based services for users. The services are provided by the client some aspects described herein. The terminal device 01 includes, but is not limited to, various user terminals, such as a notebook computer, a tablet computer, a desktop computer, a set-top box, a mobile device, and a vehicle-mounted terminal (e.g., a mobile phone, a portable music player, a personal digital assistant, a dedicated messaging device, and a portable game device). The client may provide applications in various scenes, including but not limited to cloud technology, cloud games, cloud rendering, artificial intelligence, intelligent transportation, assisted driving, video media, intelligent communities, and instant messaging.

The picture display server 02 provides services for the user by interacting with the terminal device 01. Specifically, the terminal device 01 may request a picture from the picture display server 02. In this case, a target instance corresponding to the above terminal device 01 and running on the picture display server may transmit a display information acquisition request. The picture display server 02 generates virtual primary display information for the target instance based on the display information acquisition request being received. The above display information acquisition request is transmitted by a target instance corresponding to a target display, wherein the target display is the primary display or an auxiliary display. The above virtual primary display information is transmitted to the above target instance so that the target instance is caused to determine that the target display is the primary display for that target instance, and display the rendered picture on the target display. The target instance compresses and transmits the displayed picture to the terminal device so that the terminal device may display the above picture by decompressing. In this way, the client does not need to have the capability of picture computing or picture rendering, but only needs to have the basic decompression capability.

The following describes a picture display method in the embodiments of this application, and the information related to the embodiments of this application may be information authorized by the user or fully authorized by all parties.

Figure 4:
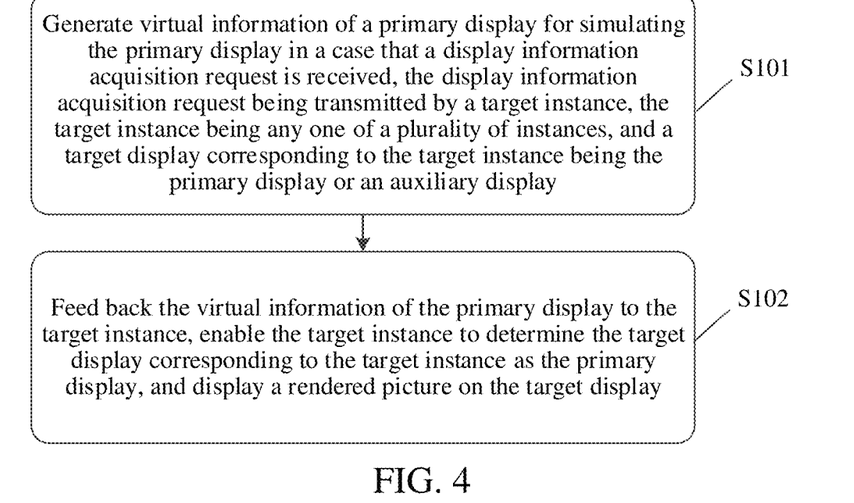
FIG. 4 is a flowchart of a picture display method according to one or more illustrative aspects described herein.

FIG. 4 shows a flowchart of a picture display method. One or more illustrative aspects described herein provide the operation steps of the above method. The method may include more or less operation steps based on conventional or non-inventive efforts. The order of steps listed in the embodiment is only one of performing orders of many steps and does not represent the only performing order. When executed, the actual system, terminal device, or server product can be executed based on the order of the method shown in the embodiments or drawings, or can be executed in parallel (for example, a parallel processor or a multi-threading environment). The above method may include the following steps.

Step S101: Generate virtual information of a primary display for simulating the primary display in a case that a display information acquisition request is received, the display information acquisition request being transmitted by a target instance, the target instance being any one of a plurality of instances, and a target display corresponding to the target instance being the primary display or an auxiliary display.

As an example, the virtual information of the primary display is simulated in a case that the display information acquisition request is received. The above display information acquisition request is transmitted by the target instance corresponding to the target display, and the above target display is the primary display or a non-primary display.

In a multi-instance scene, each instance may be allocated to a graphics card. The corresponding graphics card performs the related computing or picture rendering. By allocating a corresponding graphics card resource for each instance, computing or picture rendering between the respective instances may be performed independently and concurrently without affecting each other. In addition, the premise for each graphics card to perform computing or picture rendering is the associated corresponding display. Aspects described herein do not limit the display associated with the graphics card, and the display may be a real display or a virtual display. The target instance may be any instance running on the server. For the target instance, the server may allocate it a target graphics card and a target display adapted to it. The target display may be the primary display or the auxiliary display. For example, four graphics cards A, B, C, and D may be configured in the server. The graphics cards may correspond to four displays A1, B1, C1 and D1 respectively, wherein A1 is a primary display, and B1, C1 and D1 are auxiliary displays. The graphics card B may be associated with an instance B-10. If the instance B-10 is the target instance, the target display is B1, which is the auxiliary display. The graphics card A may be associated with an instance A-10. If the instance A-10 is the target instance, the target display is A1, which is the primary display.

The target instance may communicate with a corresponding client. In a case that the client transmits a picture request to the target instance corresponding to the client, the target instance corresponding to the client transmits the display information acquisition request to the picture display server.

In some aspects, the display information acquisition request may include a display number acquisition request, the virtual information of the primary display may include a display number or a primary display identification feature, and the generating virtual information of a primary display for simulating the primary display based on a display information acquisition request being received received may be achieved by the following technical solution: acquiring the display number or the primary display identification feature from a display isolation apparatus based on the display number acquisition request being received, the display number being the number of displays needing to be fed back in a first target case, the first target case being a case that a picture corresponding to the target instance is displayed on the primary display, and the primary display identification feature being used for characterizing the target display as the primary display.

As an example, after the above display number acquisition request is received, the display isolation apparatus is accessed to acquire the above display number or the above primary display identification feature outputted by the above display isolation apparatus. The above display isolation apparatus is configured to output the display number needing to be fed back based on a picture corresponding to the above target instance being displayed on the primary display, or output the primary display identification feature for characterizing the above target display as the primary display.

As an example, the display isolation apparatus may perform include the capability of, when acquiring the total number of the displays, it only needs to return one display once in practice. It will not really query the data of the display, but the display number may be greater than 1 in practice, depending on the actual number of the graphics cards and the displays in the server environment. When determination information characterizing whether the current display is the primary display is acquired, only determination information characterizing the current display as the primary display is returned. The determination information is an identification feature of a primary server, so that the target instance mistakes the display corresponding to the identification feature of the primary server for the primary display.

In some aspects, the above case that the picture corresponding to the target instance is transmitted to the primary display includes a case that the picture corresponding to the target instance is transmitted to the primary display, and the primary display is a sole display. It is equivalent to when the target instance falsely assumes that there is only one display in the server environment, and that this display is the primary display.

Aspects described herein do not limit the display number or the primary display identification feature fed back, and only need to achieve the purpose of confusing the target instance by the simulated display number or primary display identification feature. The purpose of confusion is achieved by confusing the target instance so that it considers the corresponding target display as the primary display. For example, if the display number fed back is 1, and the primary display identification feature characterizes the display currently associated with the target instance as the primary display, then the target instance may consider that there is only one display in the current server environment, and that this display is the primary display. In addition, the target instance knows that there is a target display in the current server environment and the target instance considers that the target display is the primary display, thereby achieving the purpose of confusion.

In some aspects, the display information acquisition request includes a primary display position feature request, the virtual information of the primary display includes the primary display position feature, and the generating virtual information of a primary display for simulating the primary display in a case that a display information acquisition request is received may be achieved by the following technical solution: acquiring the primary display position feature from a display isolation apparatus in a case that the primary display position feature request is received, the display isolation apparatus being configured to determine the primary display position feature needing to be fed back in a second target case, and the second target case being a case that a picture corresponding to the target instance is transmitted to the primary display.

As an example, in a case that the above primary display position feature request is received, the display isolation apparatus is accessed to acquire the primary display position feature outputted by the above display isolation apparatus. The above display isolation apparatus is configured to determine the above primary display position feature needing to be fed back in a case that a picture corresponding to the target instance is transmitted to the primary display.

Specifically, the above case where the picture corresponding to the target instance is transmitted to the primary display includes where the picture corresponding to the target instance is transmitted to the primary display, and the primary display is a sole display. It is equivalent to the target instance acting as if that there is only one display in the server environment, and that this display is the primary display.

Aspects described herein do not limit the primary display position feature fed back, and only need to achieve the purpose of confusing the target instance by the simulated primary display position feature. The purpose of confusion is achieved by confusing the target instance so that it considers the corresponding target display as the primary display. For example, if the primary display position feature fed back is the position of the primary display under the condition that there is only one primary display and no other displays in the server environment, then the target instance may consider that there is only one display in the current server environment, and that this display is the primary display. In addition, the target instance knows that there is a target display in the current server environment, and the target instance considers that the target display is the primary display, thereby achieving the purpose of confusion.

The above two embodiments simulate the primary display identification, the position, and the display number. The embodiments of this application do not limit other confusion ways, which depends on which specific information of the primary display needs to be acquired by the target instance. In the embodiments of this application, only the virtual information of the primary display needs to be simulated to achieve the purpose of confusion, so that the target instance falsely assumes that there is only one display in the server environment, and that this display is the primary display.

Taking the cloud game as an example, the cloud game generally acquires display information by the following steps.

First, the display number is acquired, for example, the target game instance may acquire the display number by the API. As an example, the API herein may be "a display function visible only to the computer (GetSystemMetrics (SM_CMONITORS))" and "a multi-display function (EnumDisplayMonitors/EnumDisplayDevices)". In this case, the API call is intercepted by hijacking the API, and then the display isolation apparatus is accessed to acquire the display number. It only needs to return one display once in practice, which makes the target instance unable to acquire and know the relevant data of the display in a real server environment, and thus confuses the target instance.

Second, after acquiring the display number, the target game instance may use the API. EnumDisplaySetting acquires the display information. In this case, the API may be intercepted, and then the corresponding information may be acquired by communicating with the display isolation apparatus, such as whether it is the primary display, coordinates, and resolutions. The isolation apparatus will virtualize the coordinates of each display to (0, 0) and virtualize each display to be the primary display. It will not really enumerate the display information in the server.

The display isolation apparatus in the cloud game scene may have the following capability.

When the cloud game acquires the total number of the displays, it only needs to return one display once in practice. It will not really query the data of the display, but the display number in the server environment may be greater than 1 in practice, depending on the actual number of the graphics cards and the displays in the server environment.

After knowing whether the current display is the primary display, the cloud game only notifies that it is the primary display. Namely, the cloud game feeds back an identification feature of a primary server, so that the target instance mistakes the display corresponding to the identification feature of the primary server for the primary display.

After acquiring the coordinate information of the current display, the cloud game notifies that the coordinate information thereof is (0, 0), and that the real coordinate information is not (0, 0).

Other relevant characteristics of the primary display may be simulated as needed to achieve the purpose of confusing the target instance.

By performing the above steps, the target instance may be enabled to only see the display of the graphics card run by itself and consider the display as the primary display. It does not know that there are other displays in the current server environment, and naturally does not interact with other displays, thereby achieving complete isolation between the displays by confusing the target instance.

Step S102: Feed back the virtual information of the primary display to the target instance, enable the target instance to determine the target display corresponding to the target instance as the primary display, and display a rendered picture on the target display.

As an example, the above virtual information of the primary display is fed back to the above target instance to enable the above target instance to determine the above target display as the above primary display and display the rendered picture on the above target display.

The target instance only transmits the rendered data to the primary display and triggers the primary display to display its rendered pictures, while the target instance mistakes its corresponding target display for the primary display. As such, the target instance may only display the rendered pictures on the target display without transmitting and displaying these pictures on the real primary display, achieving complete isolation between the displays.

In the cloud game scene, the server may inform the target instance running therein that there is only one display, and that this display is the primary display; and inform it of the position, attribute information, and the like of the display, so as to confuse the target instance and make it falsely assume that the target display associated therewith is the primary display, thus transmitting the rendered picture thereto.

Figure 5:
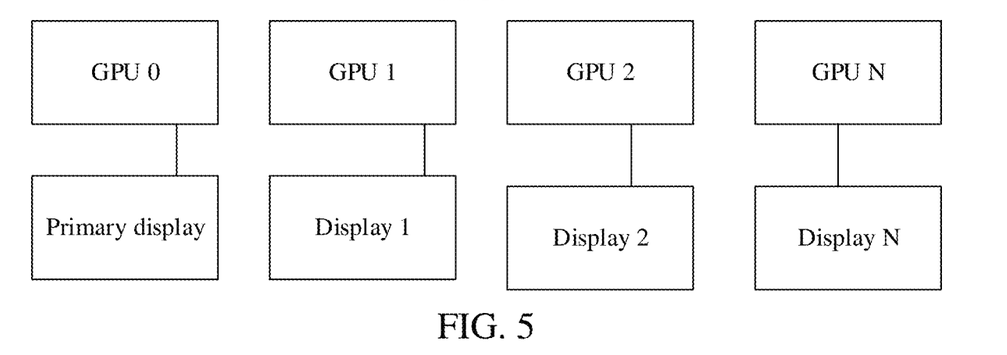
FIG. 5 is a schematic diagram of picture display according to one or more illustrative aspects described herein.

Referring to FIG. 5, a schematic diagram of picture display according to an aspect described herein is shown. GPU 0, GPU 1, GPU 2, and GPU N represent graphics cards, and each graphics card has a corresponding display. There is one primary display, and the others are all auxiliary displays. Whether it is the primary display or the auxiliary display, a corresponding instance thereof will be confused by executing the method when performing picture display. Thus, the display corresponding to the instance is considered as a sole primary display, and there is no other display, so that the rendered picture is displayed on the display corresponding to the instance without needing to be transmitted to a real primary display for display as in FIG. 2. Therefore, load balancing is achieved, and the load of the real primary display is avoided being too high. There are noted differences between aspects described herein and the related art in display effects by comparing FIG. 2 and FIG. 5. The game instance running on each GPU is only related to the virtual display connected to the current GPU, and does not cause the problem of the high load of the PCIe of the GPU connected to the primary display. Each GPU and the virtual display are independent.

According to aspects described herein, the target instance may render the picture on the target graphics card corresponding to the target display, and the rendered picture is displayed on the display determined based on the virtual information of the primary display. The display determined based on the virtual information of the primary display is the target display associated with the target instance. Therefore, after performing picture computing and rendering in the graphics card associated with the target instance, the picture may be directly displayed on the target display associated therewith without the need to transmit the picture to the real primary display for display, thereby improving the display speed, realizing picture isolation of the display, and reducing the load of the real primary display.

Specifically, determining, by the target instance, the target display corresponding to the target instance as the primary display in step S102 is actually determining, by the target instance, the target display as the primary display based on the virtual information of the primary display. Displaying the rendered picture on the target display in step S102 is actually setting a window position corresponding to the picture in the target display and transmitting the picture to the window position of the target display.

Figure 6:
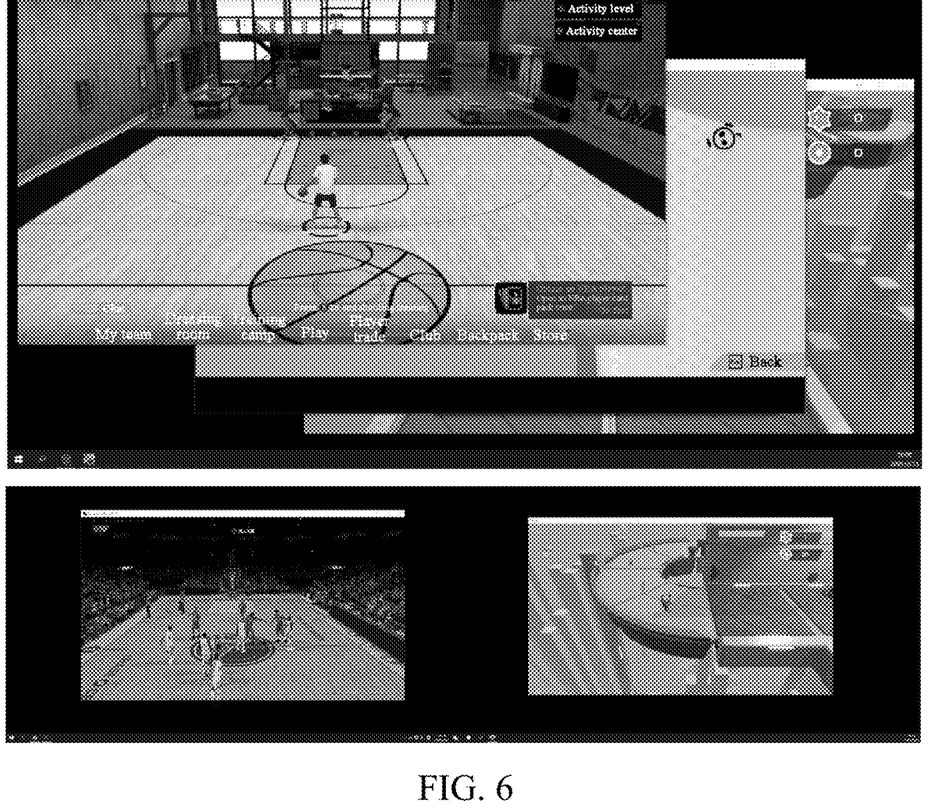
FIG. 6 is a schematic diagram comparing picture display effects according to one or more illustrative aspects described herein.
Figure 7:
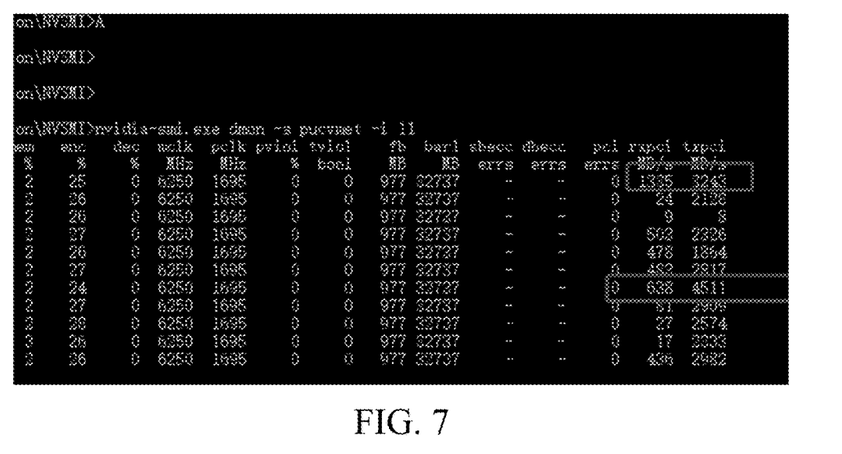
FIG. 7 is a schematic diagram of load test data according to one or more illustrative aspects described herein.

Referring to FIG. 6, a diagram comparing picture display effects is shown. The upper drawing in FIG. 6 illustrates a picture display effect in the related art. It is shown that pictures corresponding to various examples are all displayed on the primary display. Although the pictures may be concurrently rendered in respective graphics cards, all the pictures eventually need to be transmitted to a window in the primary display for display. It results in a high bandwidth load of the PCIe connected to the primary display. Referring to FIG. 7, load test data is shown. FIG. 7 is test data of a PCIe 3.0×8 version. The theoretical PCIe bi-directional bandwidth is 8 GB/s, but the actual maximum is only 6 GB/s. The occupation is now above 5 GB/s, which fully illustrates the bottleneck phenomenon in the related art for bandwidth occupation.

FIG. 6 depicts a single monitor screenshot (above) and a dual monitor screenshot (lower image, as evident from the taskbar being split in the middle of the image). It is shown in the lower image of FIG. 6 that the picture rendered by each instance is displayed on the display corresponding to the instance without the need to transmit each picture to the primary display for display. Isolation between the displays is achieved. In particular, this is complete isolation between graphics cards, and between different instances corresponding to different clients and servers in the multi-graphics card and multi-display scene according to the implementation principle of the virtual display as described herein.

Figure 8:
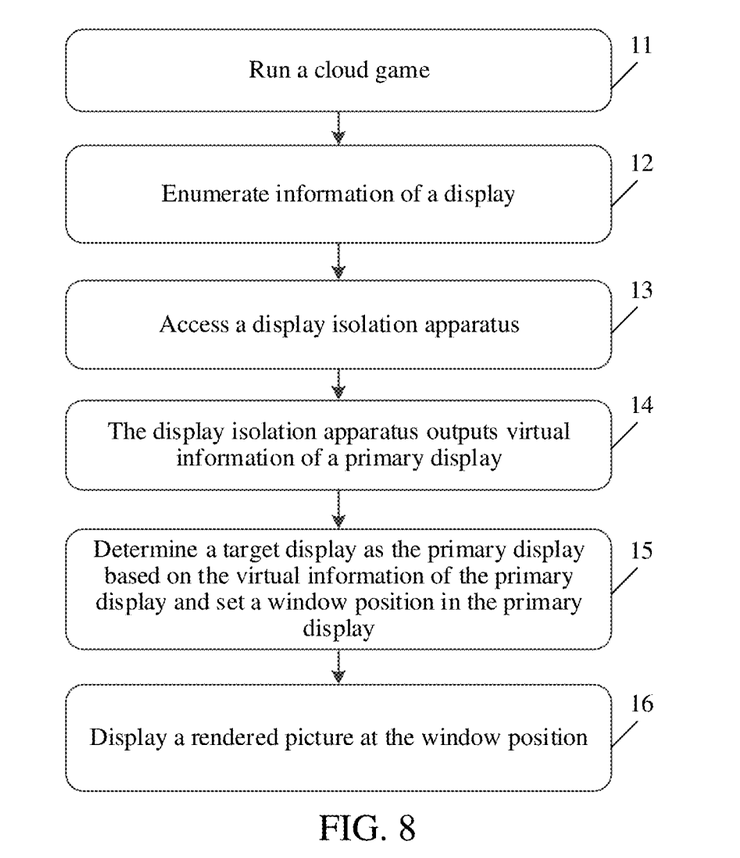
FIG. 8 is a logic diagram of picture display according to one or more illustrative aspects described herein.

Referring to FIG. 8, a logic diagram of picture display according to an illustrative aspect is shown.

Step 11: Run a cloud game.
Step 12: Enumerate information of a display.
Step 13: Access a display isolation apparatus.
Step 14: The display isolation apparatus outputs virtual information of a primary display.

Step 15: Determine a target display as the primary display based on the virtual information of the primary display and set a window position in the primary display.

Step 16: Display a rendered picture at the window position.

The display information acquisition request is acquired before performing picture display. After intercepting the request, the display isolation apparatus may be accessed. The information of the display is returned based on the access result, and the display information may confuse the target instance so that the target instance mistakes the target display corresponding thereto for a primary display, sets a window position in the target display, and displays a rendered picture at the window position of the target display. Further, the displayed picture may be compressed and transmitted to the client so that the client may also display the picture.

Aspects described herein provide a picture display scheme. By simulating the virtual information of the primary display to confuse the target instance, the target instance determines the target display corresponding thereto as the primary display, and the rendered picture is displayed on the target display, thereby achieving isolation between different displays and between different instances. In particular, with this scheme, the target instance can only see the target display corresponding thereto, but cannot sense the existence of other displays. Therefore, it avoids various abnormal and non-working problems which may occur when the target instance senses the existence of other displays and breaks through a bottleneck of concurrent performance.

Taking the cloud game as an example, aspects described herein can achieve complete isolation between the displays. When data outputted by the game is transmitted to the display, the data only passes through its own PCIe, which does not cause a bandwidth bottleneck problem of a certain graphics card PCIe, and can ensure higher performance and a high number of concurrency. In the cloud game environment, the game, like running locally, is compatible and supports more games. Aspects described herein do not limit the application scene. They are not only applicable to the cloud game scene, but also applicable to a multi-graphics card and multi-display scene of a conventional game mode. Aspects described herein also do not limit the operating system. They not only support a Windows operating system, but also support a Linux operating system or other multi-graphics card and multi-display platforms.

Figure 9:
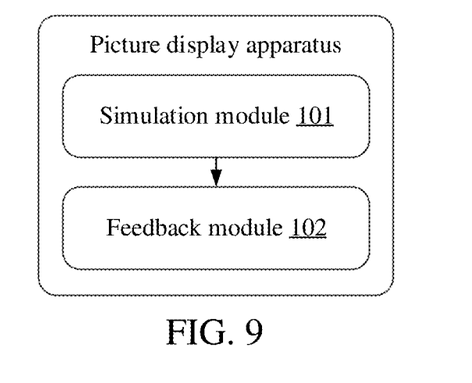
FIG. 9 is a block diagram of a picture display apparatus according to one or more illustrative aspects described herein.

Referring to FIG. 9, a block diagram of a picture display apparatus is shown. The apparatus includes:

- a simulation module 101, configured to generate virtual information of a primary display for simulating the primary display in a case that a display information acquisition request is received, the display information acquisition request being transmitted by a target instance, the target instance being any one of a plurality of instances, and a target display corresponding to the target instance being the primary display or an auxiliary display; and
- a feedback module 102, configured to feed back the virtual information of the primary display to the target instance, enable the target instance to determine the target display corresponding to the target instance as the primary display, and display a rendered picture on the target display.

According to some aspects, the display information acquisition request includes a display number acquisition request, the virtual information of the primary display includes a display number or a primary display identification feature, and the simulation module is configured to perform: acquiring the display number or the primary display identification feature from a display isolation apparatus in a case that the display number acquisition request is received, the display number being the number of displays needing to be fed back in a first target case, the first target case being a case that a picture corresponding to the target instance is displayed on the primary display, and the primary display identification feature being used for characterizing the target display as the primary display.

In some aspects, the display information acquisition request includes a primary display position feature request, the virtual information of the primary display includes the primary display position feature, and the simulation module is configured to perform: acquiring the primary display position feature from a display isolation apparatus in a case that the primary display position feature request is received, the display isolation apparatus being configured to determine the primary display position feature needing to be fed back in a second target case, and the second target case being a case that a picture corresponding to the target instance is transmitted to the primary display.

Figure 10:
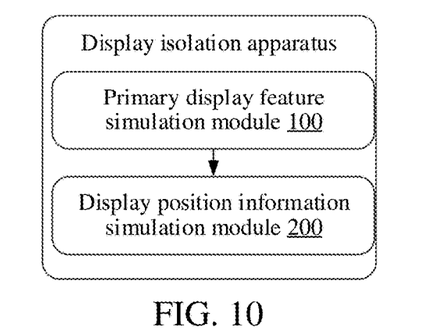
FIG. 10 is a schematic diagram of a display isolation apparatus accessed by a simulation module according to one or more illustrative aspects described herein.

Referring to FIG. 10, a schematic diagram of a display isolation apparatus accessed by a simulation module is shown. It may include a primary display feature simulation module 100 and a display position information simulation module 200. The primary display feature simulation module 100 is configured to output the display number or the primary display identification feature. The display position information simulation module 200 is configured to output the primary display position feature.

In some aspects, the picture corresponding to the target instance transmitted to the primary display includes where the picture corresponding to the target instance is transmitted to the primary display, and the primary display is a sole display.

In some aspects, the target instance is used for rendering the picture on the target graphics card corresponding to the target display, and the rendered picture is displayed on the display determined based on the virtual information of the primary display.

In some aspects, the target instance is also used for performing the following operations: the target instance determines the target display as the primary display based on the virtual information of the primary display; sets a window position corresponding to the picture in the target display and transmits the picture to the window position of the target display.

The apparatus and the method of this application are based on the same concept.

Aspects described herein further provide a computer program product and a computer program, the computer program product or the computer program including a computer instruction stored in a computer-readable storage medium. The processor of the computer device reads the computer instruction from the computer-readable storage medium, and the processor executes the computer instruction to cause the computer device to perform the picture display method.

Aspects described herein provide a computer-readable storage medium, and the computer-readable storage medium may store a plurality of instructions. The instructions may be adapted to be loaded by a processor and perform the picture display method as described herein.

In some aspects, the picture display method includes: generating virtual information of a primary display for simulating the primary display in a case that a display information acquisition request is received, the display information acquisition request being transmitted by a target instance, the target instance being any one of a plurality of instances, and a target display corresponding to the target instance being the primary display or an auxiliary display; and feeding back the virtual information of the primary display to the target instance, enabling the target instance to determine the target display corresponding to the target instance as the primary display, and displaying a rendered picture on the target display.

In some aspects, the display information acquisition request includes a display number acquisition request, the virtual information of the primary display includes a display number or a primary display identification feature, and the generating virtual information of a primary display for simulating the primary display based on a display information acquisition request being received includes: acquiring the display number or the primary display identification feature from a display isolation apparatus in a case that the display number acquisition request is received, the display number being the number of displays needing to be fed back in a first target case, the first target case being a case that a picture corresponding to the target instance is displayed on the primary display, and the primary display identification feature being used for characterizing the target display as the primary display.

In some aspects, the display information acquisition request includes a primary display position feature request, the virtual information of the primary display includes the primary display position feature, and the generating virtual information of a primary display for simulating the primary display in a case that a display information acquisition request is received includes: acquiring the primary display position feature from a display isolation apparatus based on the primary display position feature request being received, the display isolation apparatus being configured to determine the primary display position feature needing to be fed back in a second target case, and the second target case being a case that a picture corresponding to the target instance is transmitted to the primary display.

In some aspects, the picture corresponding to the target instance being transmitted to the primary display includes where the picture corresponding to the target instance is transmitted to the primary display, and the primary display is a sole display.

In some aspects, before displaying a rendered picture on the target display, the method further includes: rendering, by the target instance, the picture on a target graphics card corresponding to the target display.

In some aspects, the enabling the target instance to determine the target display corresponding to the target instance as the primary display includes: determining, by the target instance, the target display as the primary display based on the virtual information of the primary display; and the displaying a rendered picture on the target display includes: setting a window position corresponding to the picture in the target display and transmitting the picture to the window position of the target display.

Figure 11:
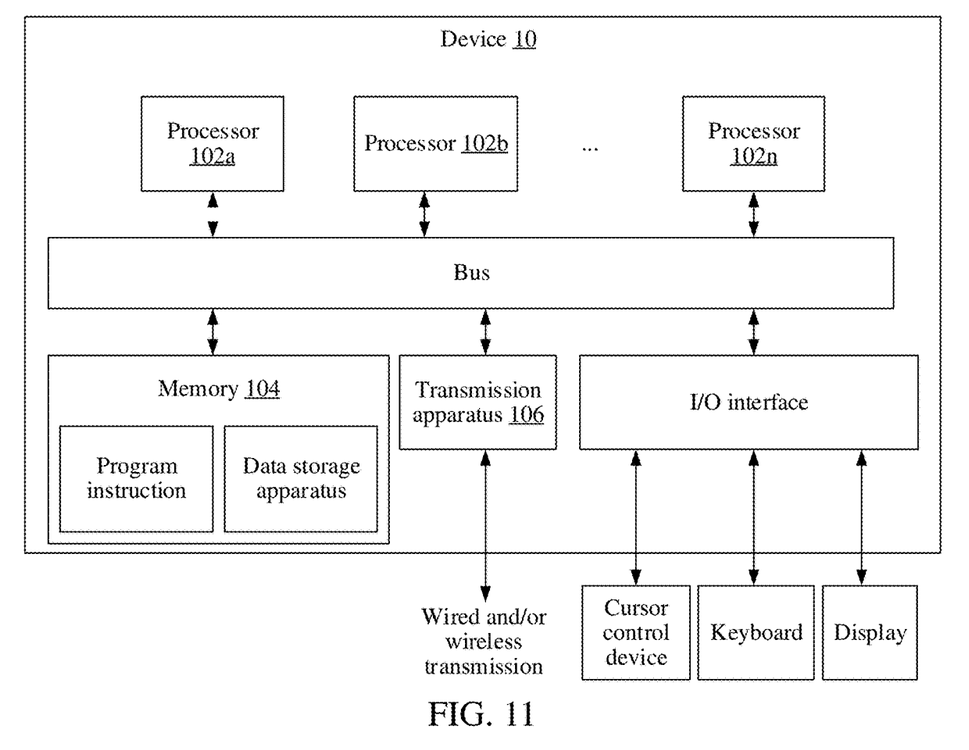
FIG. 11 is a schematic diagram of a hardware structure of a device to implement a method according to one or more illustrative aspects described herein.

FIG. 11 shows a schematic diagram of a hardware structure of a device to implement a method according to one or more illustrative aspects described herein. The device may participate in the construction or inclusion of an apparatus or system as described herein. As shown in FIG. 11, the device 10 may include one or more (shown as 102a, 102b ... 102n in the drawing) processors 102 (the processors 102 may include, but are not limited to, processing apparatuses, such as a microprocessor MCU or a programmable logic device FPGA), a memory 104 configured to store data, and a transmission apparatus 106 configured for communication functions. In addition, it may further include: a display, an input/output interface (I/O interface), a universal serial bus (USB) port (which may be included as one of the ports of the I/O interface), a network interface, a power supply, and/or a camera. It can be understood by those skilled in the art that the structure shown in FIG. 11 is merely illustrative and is not intended to limit the structure of the electronic apparatus. For example, the device 10 may further include more or fewer components than the components shown in FIG. 11, or have a configuration different from the components shown in FIG. 11.

In addition, one or more processors 102 and/or other data processing circuits may be generally referred to as "data processing circuits" herein. The data processing circuits may be embodied in whole or in part as software, hardware, firmware, or any other combination. Further, the data processing circuits may be a single stand-alone processing module, or incorporated in whole or in part into any one of other elements in the device 10 (or the mobile device). As described herein, the data processing circuit acts as a processor control (e.g., a selection of terminal paths for a variable resistor connected to the interface).

The memory 104 may be configured to store a software program and a module of application software. As a program instruction/data storage apparatus corresponding to the method described herein, the processor 102 runs the software program and module stored in the memory 104 so as to perform various functional applications and data processing, e.g., the implemented picture display method. The memory 104 may include a high-speed random access memory and may further include a non-volatile memory, such as one or more magnetic storage apparatuses, a flash memory, or other non-volatile solid-state memories. In some instances, the memory 104 may further include memories remotely arranged with respect to the processor 102, and these remote memories may be connected to the device 10 via a network. Instances of the network include, but are not limited to, the Internet, intranets, local area networks, mobile communication networks, and combinations thereof.

The transmission apparatus 106 is configured to receive or transmit data via a network. A particular instance of the network may include a wireless network provided by a communication provider of the device 10. In one instance, the transmission apparatus 106 includes a network interface controller (NIC), which may be connected to other network devices by a base station so as to communicate with the Internet. In one instance, the transmission apparatus 106 may be a radio frequency (RF) module configured to communicate with the Internet by a wireless way.

The display may be, for example, a liquid crystal display (LCD) in a touchscreen type that enables the user to interact with the user interface of the device 10 (or the mobile device).

Figure 12:
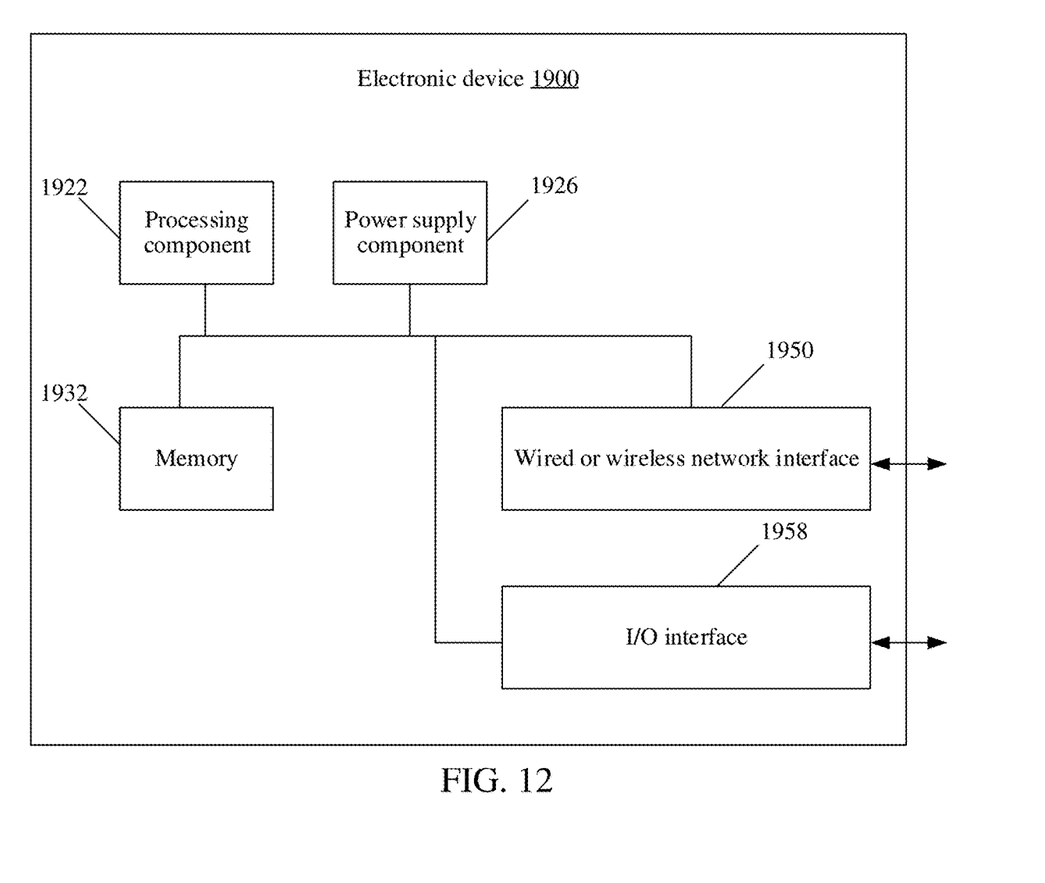
FIG. 12 is a schematic diagram of a hardware structure of another device to implement a method according to one or more illustrative aspects described herein.

FIG. 12 shows a block diagram of another electronic device according to one or more illustrative aspects described herein. For example, an electronic device 1900 may be provided as a server. Referring to FIG. 12, the electronic device 1900 includes a processing component 1922 that further includes one or more processors, and a memory resource represented by a memory 1932 is configured to store instructions, such as application programs, executable by the processing component 1922. An application program stored in the memory 1932 may include one or more modules, and each module corresponding to a set of instructions. Further, the processing component 1922 is configured to execute instructions to perform the method.

The electronic device 1900 may further include a power supply component 1926 configured to perform power supply management of the electronic device 1900. A wired or wireless network interface 1950 is configured to connect the electronic device 1900 to a network and an I/O interface 1958. The electronic device 1900 may operate based on an operating system stored in the memory 1932, such as Windows Server™, Mac OS X™, Unix™, Linux™, or FreeBSD™.

In an illustrative embodiment, a non-volatile computer-readable storage medium is further provided, such as the memory 1932, including computer program instructions. The computer program instructions may be executed by the processing component 1922 of the electronic device 1900 to perform the method.

The order in which various aspects are described herein is merely illustrative and does not represent the advantages or disadvantages of the various aspects. Other aspects are also within the scope of the attached claims. In some cases, the actions or steps recorded in the claims may be executed in an order different from the order described above and can still achieve the desired results. Additionally, the processes depicted in the drawings do not necessarily require the particular order shown or a sequential order to achieve the desired results. In some implementations, multi-tasking processing and parallel processing are also possible or may be advantageous.

The various aspects included herein are described in a progressive way, the same and similar parts between various embodiments may be referred to each other, and different aspects may focus on the differences from other aspects. In particular, the apparatus and server are similar to the method, except as to form of implementation. Therefore, the description is relatively simple, and the relevant details may refer to the description of other aspects.

It will be appreciated by those skilled in the art that all or part of the steps for implementing the techniques described herein may be performed by hardware or may be performed by the related hardware indicated by the program. The program may be stored in a computer-readable storage medium. The storage medium mentioned may be a read-only memory, a magnetic disc, a compact disc, or any other storage medium now known or developed in the future.

The above descriptions are merely illustrative and are not intended to limit the scope of the subject matter described herein. Any modifications, equivalents, improvements, and the like within the spirit and principles described herein are to be included in the scope of protection as defined by the following claims, to the fullest extent possible.

What is claimed is:

1. A computer-assisted method comprising:
 receiving, from a target instance of a plurality of instances executed on a server, a request for information associated with a primary display of a plurality of displays, wherein the plurality of displays comprises the primary display and at least one non-primary display, wherein the target instance is configured to render pictures on the primary display, and wherein the request for information associated with the primary display comprises a request for a primary display identification;
 generating, based on the target instance corresponding to a non-primary display of the at least one non-primary display, virtual display information that simulates the corresponding non-primary display as a primary display for the target instance, wherein the virtual display information indicates an identification of the non-primary display, corresponding to the target instance, as the requested primary display identification;
 sending the virtual display information to the target instance, wherein the virtual display information is configured to enable the target instance to identify the non-primary display as the primary display for the target instance; and
 generating, by the target instance, a rendered picture for the corresponding non-primary display.

2. The method according to claim 1, wherein the request for information associated with the primary display comprises a request for a quantity of the plurality of displays, and wherein the virtual display information indicates the quantity is equal to one.

3. The method according to claim 1, wherein the generating the virtual display information comprises obtaining the virtual display information from a display isolation apparatus.

4. The method according to claim 1, wherein the request for information associated with the primary display comprises a request for a primary display position, and wherein the virtual display information comprises a virtualized position for the primary display.

5. The method according to claim 4, wherein the virtualized position corresponds to a central coordinate.

6. The method according to claim 1, wherein each of the plurality of displays is associated with a respective graphics card of a plurality of graphical cards.

7. The method according to claim 6, wherein the generating the rendered picture comprises:
 rendering, by the target instance, the picture on a graphics card corresponding to the non-primary display.

8. The method according to claim 1, further comprising transmitting, to a cloud game terminal corresponding to the non-primary display, the rendered picture for display.

9. The method according to claim 1, wherein the plurality of displays are virtual displays of the server.

10. A non-transitory computer-readable medium storing computer instructions that, when executed by one or more processors, cause performance of actions comprising:
 receiving, from a target instance of a plurality of instances executed on a server, a request for information associated with a primary display of a plurality of displays, wherein the plurality of displays comprises the primary display and at least one non-primary display, wherein the target instance is configured to render pictures on the primary display, and wherein the request for information associated with the primary display comprises a request for a primary display identification;
 generating, based on the target instance corresponding to a non-primary display of the at least one non-primary display, virtual display information that simulates the corresponding non-primary display as a primary display for the target instance, wherein the virtual display information indicates an identification of the non-primary display, corresponding to the target instance, as the requested primary display identification;
 sending the virtual display information to the target instance, wherein the virtual display information is configured to enable the target instance to identify the non-primary display as the primary display for the target instance; and
 generating a rendered picture for the corresponding non-primary display.

11. The non-transitory computer-readable medium according to claim 10, wherein the request for information associated with the primary display comprises a request for a primary display position, and wherein the virtual display information comprises a virtualized position corresponding to a position of the primary display.

12. A computer-assisted method comprising:
receiving, from a target instance of a plurality of instances executed on a server, a request for information associated with a primary display of a plurality of displays, wherein the plurality of displays comprises the primary display and at least one non-primary display, wherein the target instance is configured to render pictures on the primary display, wherein the request for information associated with the primary display comprises a request for a primary display position,
generating, based on the target instance corresponding to a non-primary display of the at least one non-primary display, virtual display information that simulates the corresponding non-primary display as a primary display for the target instance, wherein the virtual display information comprises a virtualized position for the primary display;
sending the virtual display information to the target instance, wherein the virtual display information is configured to enable the target instance to identify the non-primary display as the primary display for the target instance; and
generating, by the target instance, a rendered picture for the corresponding non-primary display.

13. The method according to claim 12, wherein the request for information associated with the primary display comprises a request for a quantity of the plurality of displays, and wherein the virtual display information indicates the quantity is equal to one.

14. The method according to claim 12, wherein the request for information associated with the primary display comprises a request for a primary display identification, and wherein the virtual display information indicates an identification of the non-primary display, corresponding to the target instance, as the requested primary display identification.

15. The method according to claim 12, wherein the generating the virtual display information comprises obtaining the virtual display information from a display isolation apparatus.

16. The method according to claim 12, wherein the virtualized position corresponds to a central coordinate.

17. The method according to claim 12, wherein each of the plurality of displays is associated with a respective graphics card of a plurality of graphical cards.

18. The method according to claim 17, wherein the generating the rendered picture comprises:
rendering, by the target instance, the picture on a graphics card corresponding to the non-primary display.

19. The method according to claim 12, further comprising transmitting, to a cloud game terminal corresponding to the non-primary display, the rendered picture for display.

20. The method according to claim 12, wherein the plurality of displays are virtual displays of the server.

* * * * *